US010745051B2

(12) United States Patent
Tanaka et al.

(10) Patent No.: US 10,745,051 B2
(45) Date of Patent: Aug. 18, 2020

(54) REAR SUBFRAME STRUCTURE

(71) Applicant: MAZDA MOTOR CORPORATION, Hiroshima (JP)

(72) Inventors: Masaaki Tanaka, Hiroshima (JP); Katsuyuki Komiya, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 351 days.

(21) Appl. No.: 15/761,767

(22) PCT Filed: Nov. 2, 2016

(86) PCT No.: PCT/JP2016/082706
§ 371 (c)(1),
(2) Date: Mar. 20, 2018

(87) PCT Pub. No.: WO2017/082150
PCT Pub. Date: May 18, 2017

(65) Prior Publication Data
US 2020/0207417 A1   Jul. 2, 2020

(30) Foreign Application Priority Data
Nov. 11, 2015   (JP) .................................. 2015-221308

(51) Int. Cl.
*B62D 21/03*    (2006.01)
*B62D 21/11*    (2006.01)

(52) U.S. Cl.
CPC .............. *B62D 21/03* (2013.01); *B62D 21/11* (2013.01); *B60G 2200/144* (2013.01);
(Continued)

(58) Field of Classification Search
CPC .. B62D 21/03; B62D 21/11; B60G 2200/144; B60G 2204/15; B60G 2206/60; B60G 2206/604
See application file for complete search history.

(56) References Cited

U.S. PATENT DOCUMENTS 5,556,133 A * 9/1996 Oku ..................... B60K 15/063
280/781
5,562,308 A   10/1996 Kamei et al.
(Continued)

FOREIGN PATENT DOCUMENTS

EP   1 937 498 B2   11/2016
JP   H02-048486 U   4/1990
(Continued)

OTHER PUBLICATIONS

International Search Report issued in PCT/JP2016/082706; dated Dec. 27, 2016.

*Primary Examiner* — Drew J Brown
(74) *Attorney, Agent, or Firm* — Studebaker & Brackett PC

(57) ABSTRACT

A rear subframe structure is provided with a rear subframe configured such that a front cross member, a rear cross member, a pair of left and right upper side members extending in a vehicle front-rear direction, and a pair of left and right lower side members extending in the vehicle front-rear direction are connected; and a vehicle-body mounting portion formed on each of both ends of the front cross member in the vehicle width direction, and on each of rear ends of the upper side members. The rear subframe further includes a lower-arm support portion formed on a lower lateral portion of the rear cross member, and a stabilizer support member for supporting a stabilizer. The rear cross member connects the upper side members and the lower side members in an up-down direction. The rear cross member includes an upper-surface rear-side projection portion projecting rearwardly. The stabilizer support member is mounted between the lower-arm support portion and the upper-surface rear-side projection portion of the rear cross member.

3 Claims, 16 Drawing Sheets

(52) U.S. Cl.
CPC ...... *B60G 2204/15* (2013.01); *B60G 2206/60* (2013.01); *B60G 2206/604* (2013.01)

(56) References Cited

U.S. PATENT DOCUMENTS

| | | | |
|---|---|---|---|
| 6,511,096 B1 | 1/2003 | Kunert et al. | |
| 9,682,727 B2 * | 6/2017 | Tanaka | B62D 21/11 |
| 10,562,569 B2 * | 2/2020 | Tanaka | B60G 7/02 |
| 10,604,186 B2 * | 3/2020 | Tanaka | B60G 99/002 |
| 10,618,556 B2 * | 4/2020 | Tanaka | B62D 21/11 |
| 2014/0183834 A1 | 7/2014 | Okuyama et al. | |
| 2018/0265131 A1 * | 9/2018 | Tanaka | B60G 3/20 |
| 2018/0281860 A1 * | 10/2018 | Tanaka | B62D 21/11 |
| 2019/0061821 A1 * | 2/2019 | Tanaka | B62D 21/00 |

FOREIGN PATENT DOCUMENTS

| | | |
|---|---|---|
| JP | H08-058614 A | 3/1996 |
| JP | 2000-264245 A | 9/2000 |
| JP | 2009-190684 A | 8/2009 |
| JP | 2014-128991 A | 7/2014 |

\* cited by examiner

REAR SUBFRAME STRUCTURE

TECHNICAL FIELD

The present invention relates to a rear subframe structure of a vehicle, and more particularly, to a rear subframe structure provided with a rear subframe configured such that a front cross member extending in a vehicle width direction, a rear cross member extending in the vehicle width direction on the rear side of the front cross member, a pair of left and right upper side members extending in a vehicle front-rear direction, and a pair of left and right lower side members extending in the vehicle front-rear direction are connected in a substantially grid pattern in a plan view of a vehicle; and a vehicle-body mounting portion formed on each of both ends of the front cross member in the vehicle width direction, and on each of rear ends of the upper side members.

BACKGROUND ART

Generally, a rear subframe is configured such that a pair of front and rear cross members extending in a vehicle width direction, and left and right side members extending in a vehicle front-rear direction are connected substantially in a grid pattern in a plan view of a vehicle.

In a case where a pair of upper and lower side members are provided, a vehicle-body mounting portion is formed on a rear portion of the upper side member, and the upper and lower side members are connected by a rear cross member, load may be input to the vicinity of the vehicle-body mounting portion of the rear cross member in a concentrated manner.

In view of the above, there is proposed an idea such that a closed section of a rear cross member is increased to secure high rigidity of a rear subframe. However, simply increasing a closed section of a rear cross member may make it difficult to secure high rigidity, while securing a space for installing a stabilizer.

Patent Literature 1 discloses an integral type rear suspension including an integral link, in addition to a front cross member, a rear cross member, and left and right side members. However, Patent Literature fails to disclose a stabilizer and a stabilizer support member.

Further, Patent Literature 2 discloses a configuration, in which a stabilizer support member is mounted on a rear portion of a rear cross member, and a stabilizer is mounted on the stabilizer support member. However, Patent Literature 2 lacks a technical idea that a closed section of a rear cross member is increased. Thus, there is room for improvement in the aspect of increasing rigidity.

CITATION LIST

Patent Literature

Patent Literature 1: Specification of European Patent No. 1937498
Patent Literature 2: Japanese Unexamined Patent Publication No. 2014-128991

SUMMARY OF INVENTION

An object of the present invention is to provide a rear subframe structure which enables to increase a closed section of a rear cross member, while securing a space for installing a stabilizer without increasing the number of parts.

An aspect of the present invention is directed to a rear subframe structure provided with a rear subframe configured such that a front cross member extending in a vehicle width direction, a rear cross member extending in the vehicle width direction on a rear side of the front cross member, a pair of left and right upper side members extending in a vehicle front-rear direction, and a pair of left and right lower side members extending in the vehicle front-rear direction are connected in a substantially grid pattern in a plan view of a vehicle; a vehicle-body mounting portion formed on each of both ends of the front cross member in the vehicle width direction, and on each of rear ends of the upper side members; a lower-arm support portion formed on a lower lateral portion of the rear cross member; and a stabilizer support member for supporting a stabilizer. The rear cross member connects the upper side members and the lower side members in an up-down direction. The rear cross member includes an upper-surface rear-side projection portion projecting rearwardly by having a closed sectional structure of a T-shape in a side view, the closed sectional structure being such that a size thereof in a vehicle front-rear direction is increased along the upper side members. The stabilizer support member is mounted between the lower-arm support portion and the upper-surface rear-side projection portion of the rear cross member.

DESCRIPTION OF EMBODIMENTS

In the following, an embodiment of the present invention is described in detail based on the drawings.

Figure 1:
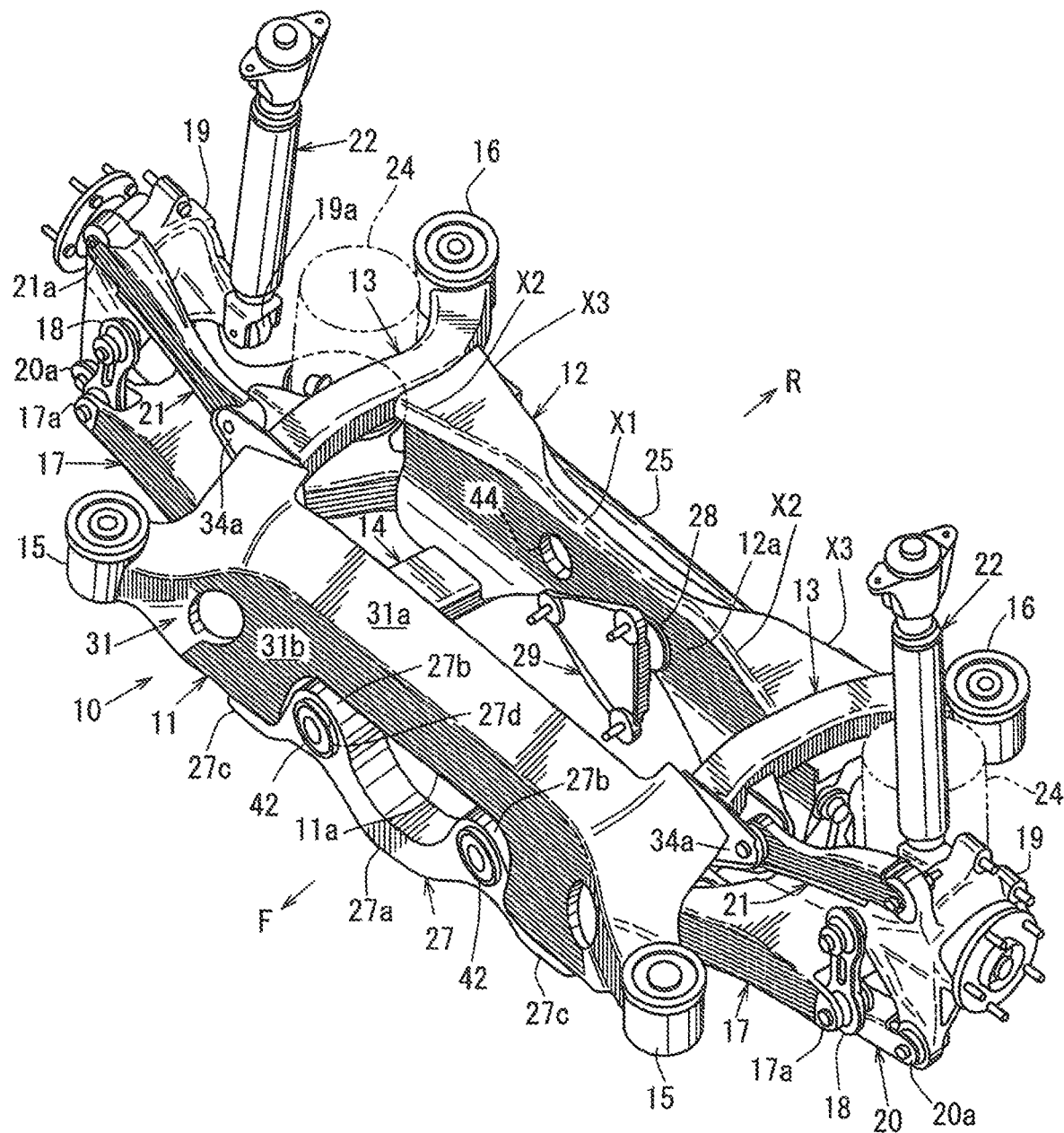
FIG. 1 is a perspective view of a rear subframe structure according to the present invention.
Figure 2:
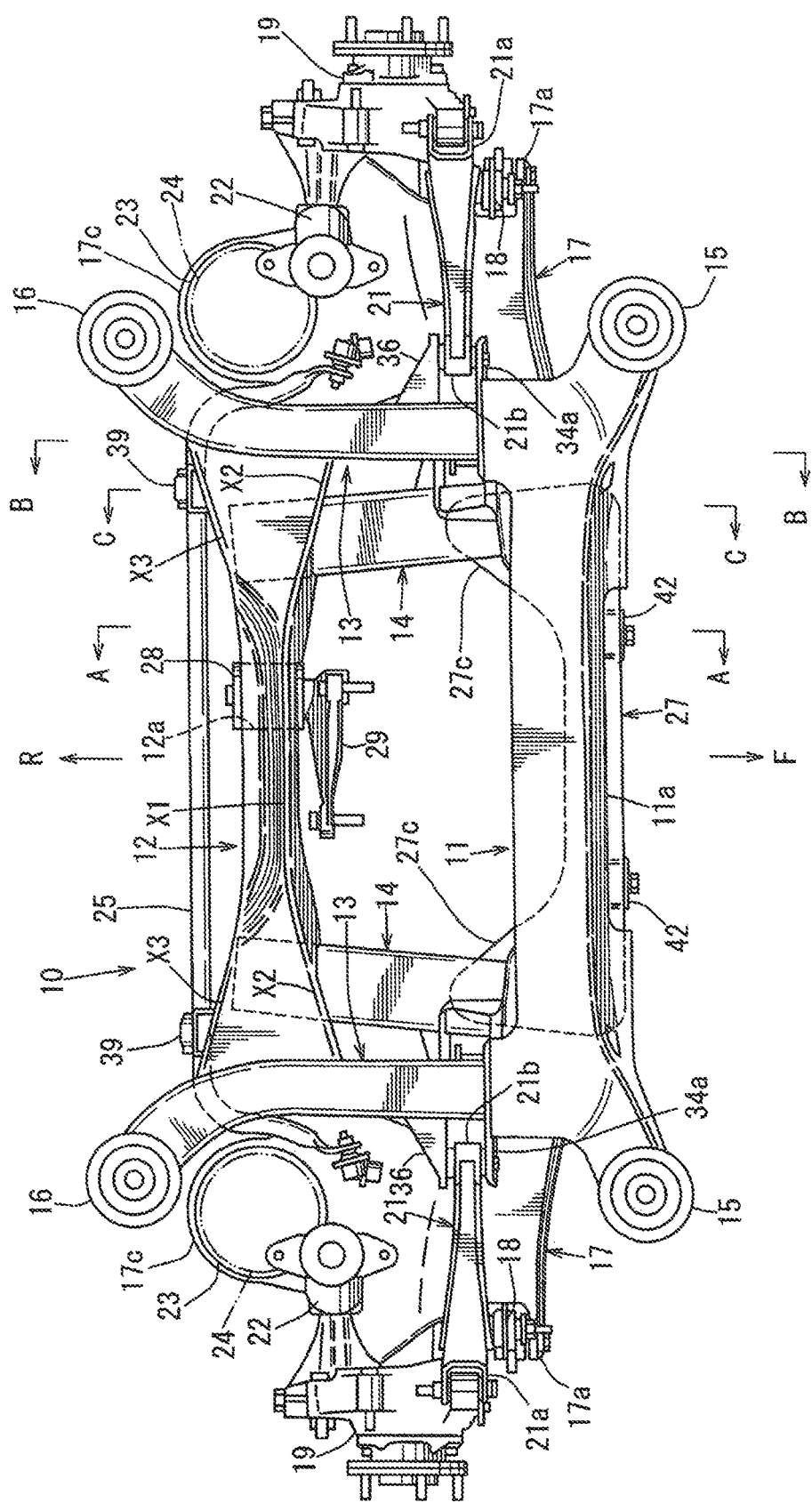
FIG. 2 is a plan view of the rear subframe structure.
Figure 3:
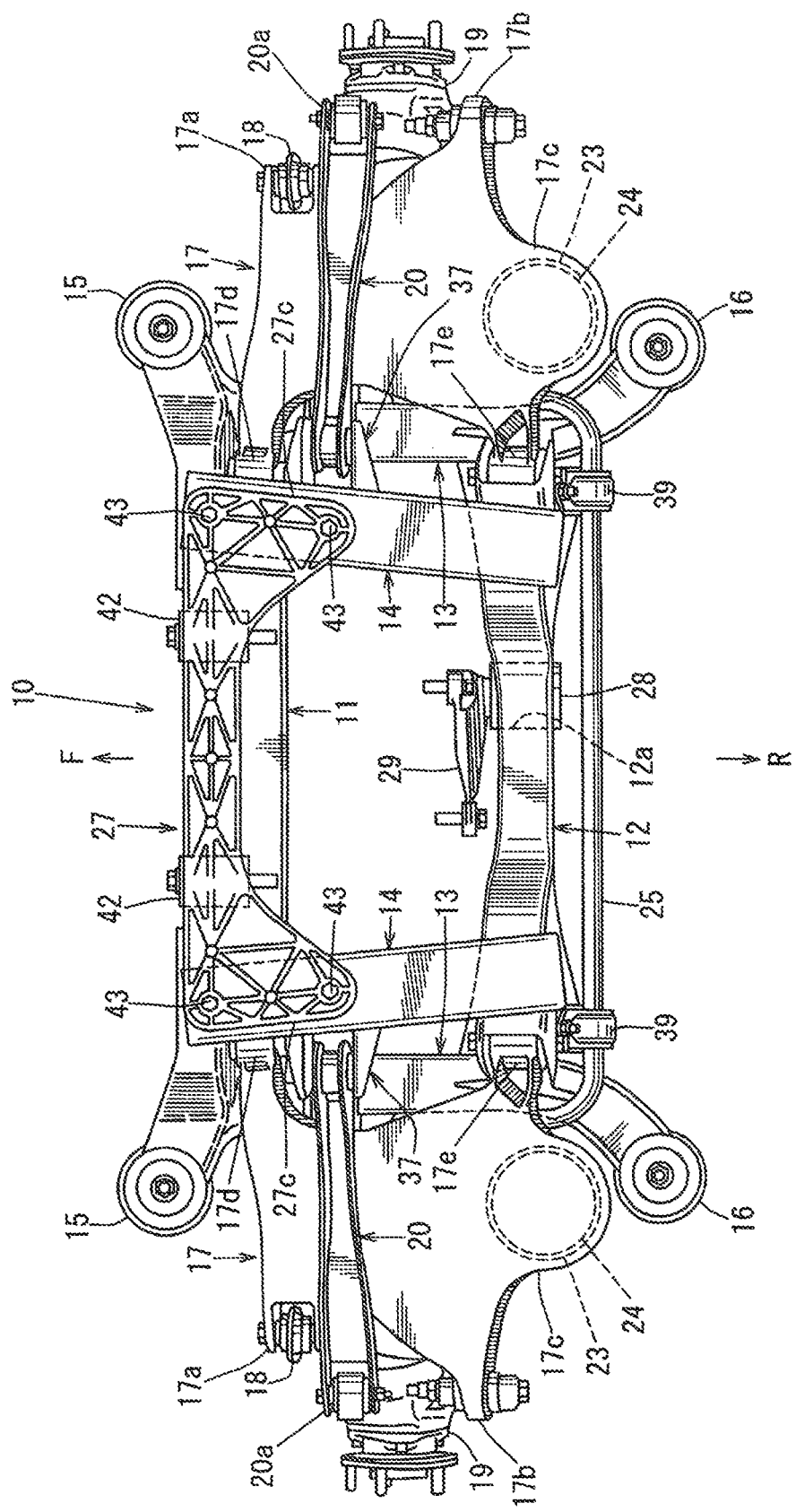
FIG. 3 is a bottom view of the rear subframe structure.
Figure 4:
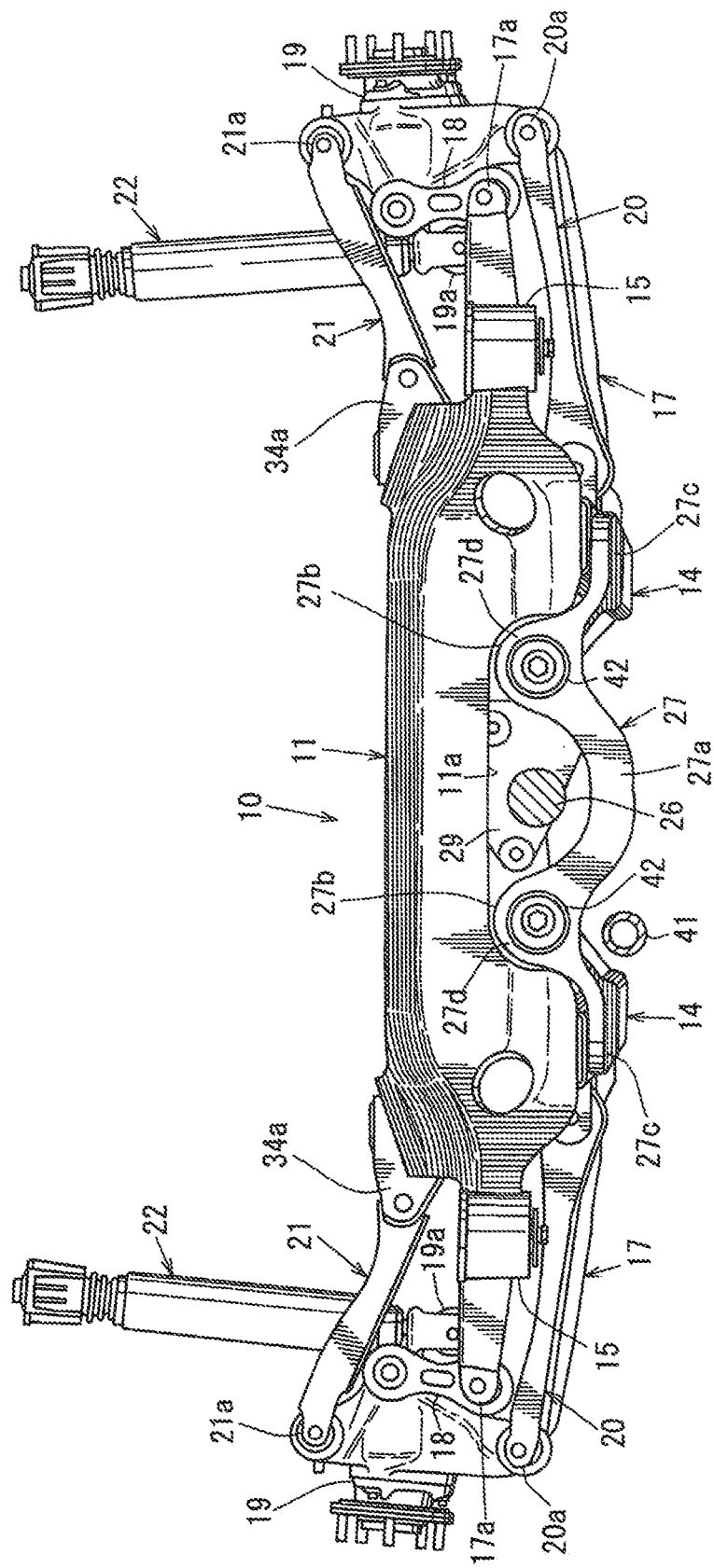
FIG. 4 is a front view of the rear subframe structure.
Figure 5:
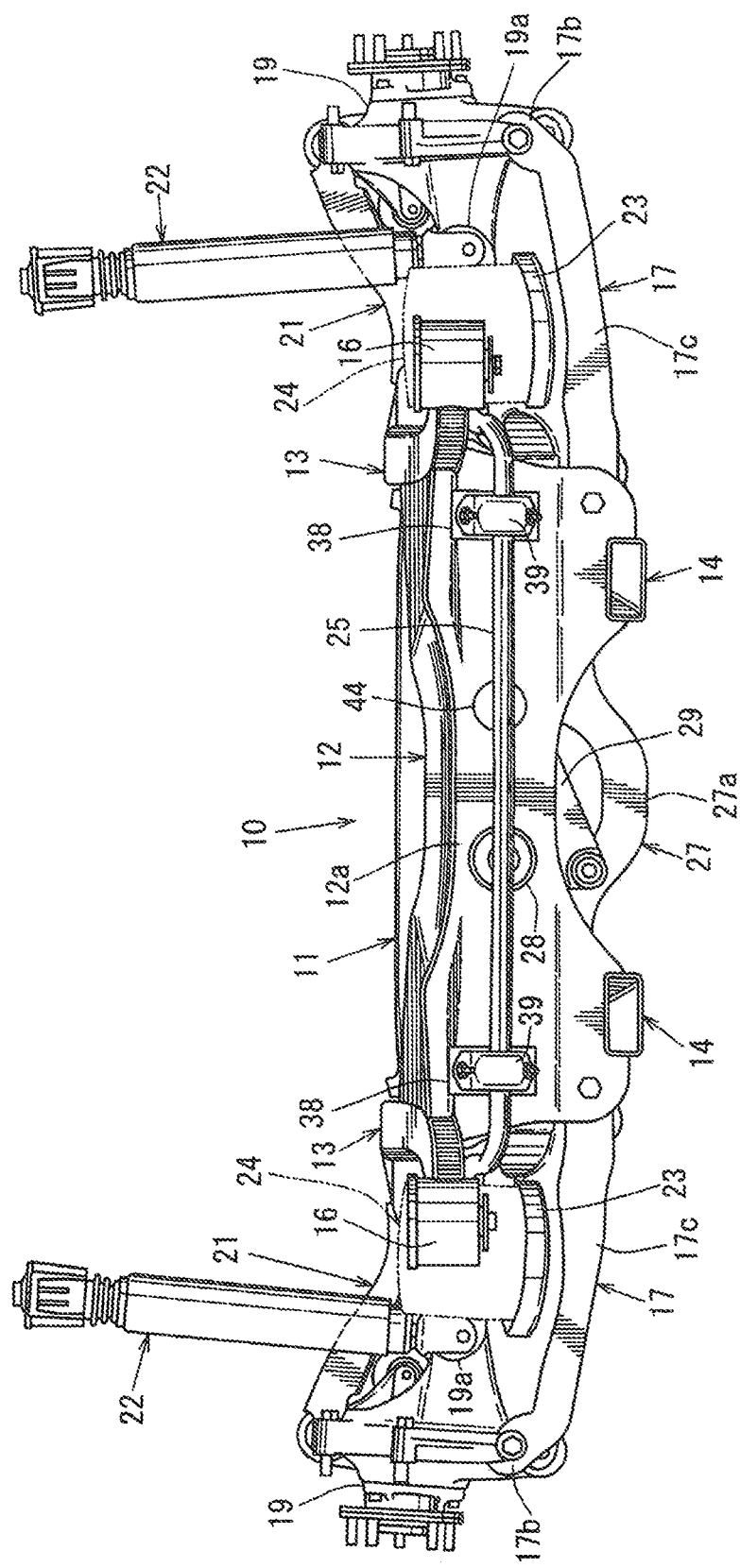
FIG. 5 is a rear view of the rear subframe structure.

FIG. 1 is a perspective view of a rear subframe structure, FIG. 2 is a plan view of the rear subframe structure, FIG. 3 is a bottom view of the rear subframe structure, FIG. 4 is a front view of the rear subframe structure, and FIG. 5 is a rear view of the rear subframe structure. In FIG. 1, the arrow F indicates a vehicle front side, the arrow R indicates a vehicle rear side, the arrow IN indicates an inner side in a vehicle width direction, and the arrow OUT indicates an outer side in a vehicle width direction (the same definition is also applied to the other drawings).

Referring to FIG. 1 to FIG. 5, a rear subframe 10 for supporting a rear suspension includes a front cross member 11 extending in the vehicle width direction on the front side, a rear cross member 12 extending in the vehicle width direction on the rear side, a pair of upper side members 13 and 13 (hereinafter, briefly referred to as upper side members 13) for connecting the front cross member 11 and the rear cross member 12 in a vehicle front-rear direction, and a pair of lower side members 14 and 14 (hereinafter, briefly referred to as lower side members) for connecting the front cross member 11 and the rear cross member 12 in the vehicle front-rear direction. These members are connected substantially in a grid pattern in a plan view of a vehicle. Each of the members 11 to 14 has a closed sectional structure.

In the embodiment, the upper side member 13 is connected to a lateral portion of the front cross member 11 in the vehicle width direction via a pillar portion 33 to be described later (see FIG. 10), and extends from the connection portion rearwardly of a vehicle.

Further, the rear cross member 12 connects rear portions of the paired left and right upper side members 13 and 13 in the vehicle width direction, connects rear portions of the paired left and right lower side members 14 and 14 in the vehicle width direction, and further connects the upper and lower side members 13 and 14 in an up-down direction.

As illustrated in FIG. 2, the lower side member 14 is located on the inner side than the upper side member 13 in the vehicle width direction, and connects a lower portion of the front cross member 11 and a lower portion of the rear cross member 12 in the vehicle front-rear direction.

As illustrated in FIG. 2 and FIG. 3, a distance between rear ends of the paired left and right lower side members 14 and 14 is set smaller than a distance between front ends of the paired left and right lower side members 14 and 14. Thereby, lower-arm rear-side support portions 12b and 12c (see FIG. 6) to be described later are formed at positions where the lower-arm rear-side support portions 12b and 12c overlap the upper side member 13 in a plan view.

As illustrated in FIG. 1 to FIG. 5, front-side vehicle-body mounting portions 15 and 15 are formed on both ends of the front cross member 11 in the vehicle width direction. A rear portion of the upper side member 13 is smoothly formed into a curve rearwardly of a vehicle and outwardly in the vehicle width direction. Rear-side vehicle-body mounting portions 16 and 16 are formed on rear ends of the upper side members 13 and 13. The rear subframe 10 is mounted to a vehicle body, specifically, to a rear side frame via the vehicle-body mounting portions 15 and 16.

The reference numeral 17 denotes a lower arm. A link support portion 17a is formed on a front portion of an outer end of the lower arm 17 in the vehicle width direction. A lower end of an integral link 18 is pivotally supported on the link support portion 17a. An upper end of the integral link 18 is pivotally connected to an integral link support portion of a hub support 19. The integral link 18 is a link for controlling a recession angle (an angle defined by a road surface, and a swing trajectory of a rear wheel in a side view when the rear wheel moves up and down in a case where the rear wheel rides on a step).

In the embodiment, an H-shaped lower arm is employed as the lower arm 17. A connection portion 17b is formed on a rear portion of an outer end of the lower arm 17 in the vehicle width direction (see FIG. 3). The connection portion 17b is pivotally connected to a lower-arm support portion of the hub support 19.

The reference numeral 20 denotes a toe control link for setting a rear wheel to toe-in so as to secure wheel straightness. A connection portion 20a is formed on an outer end of the toe control link 20 in the vehicle width direction. The connection portion 20a is pivotally connected to a toe control link support portion of the hub support 19.

The reference numeral 21 denotes an upper arm. A connection portion 21a is formed on an outer end of the upper arm 21 in the vehicle width direction. The connection portion 21a is pivotally connected to an upper-arm support portion of the hub support 19. In the embodiment, an I-shaped upper arm is employed as the upper arm 21.

As illustrated in FIG. 1, FIG. 4, and FIG. 5, a damper support portion 19a is integrally formed on the hub support 19. A damper 22 of a strut structure is mounted on the damper support portion 19a.

As illustrated in FIG. 2 and FIG. 3, a bulging portion 17c bulging rearwardly is formed on a rear portion of the lower arm 17. A coil spring 24 is wound between a spring lower retainer 23 mounted on an upper portion of the bulging portion 17c, and a spring upper retainer (not illustrated) provided on the rear side frame on the vehicle body side.

As illustrated in FIG. 2, FIG. 3, and FIG. 5, a stabilizer 25 is provided on the rear side of the rear cross member 12 along the rear cross member 12. The stabilizer 25 is formed into a bent shape forwardly of a vehicle in such a manner that left and right ends of the stabilizer 25 are located above the lower arm 17. The bent ends of the stabilizer 25 are connected to the lower arm 17 by using a connection member. The stabilizer 25 is configured to suppress a roll angle when one wheel is bumped or rebound by torsional rigidity resistance.

As illustrated in FIG. 4, a tunnel portion 11a for receiving a propeller shaft 26 is formed in the middle of a lower portion of the front cross member 11. The front cross member 11 is formed into a saddle shape. Further, a brace 27 as a reinforcement member for connecting lower portions of the tunnel portions 11a in the vehicle width direction is provided.

As illustrated in FIG. 1 to FIG. 3, a differential mount portion 12a is formed on an intermediate portion of the rear cross member 12 in the vehicle width direction. A differential mount bracket 29 is mounted on the differential mount portion 12a via a differential mount bush 28.

A vehicle in the embodiment is a vehicle of a type (so-called FR type vehicle) such that a driving force is transmitted to rear wheels. The vehicle is configured such that a rear portion of a rear differential device (not illustrated) is supported by the differential mount bracket 29.

Figure 6:
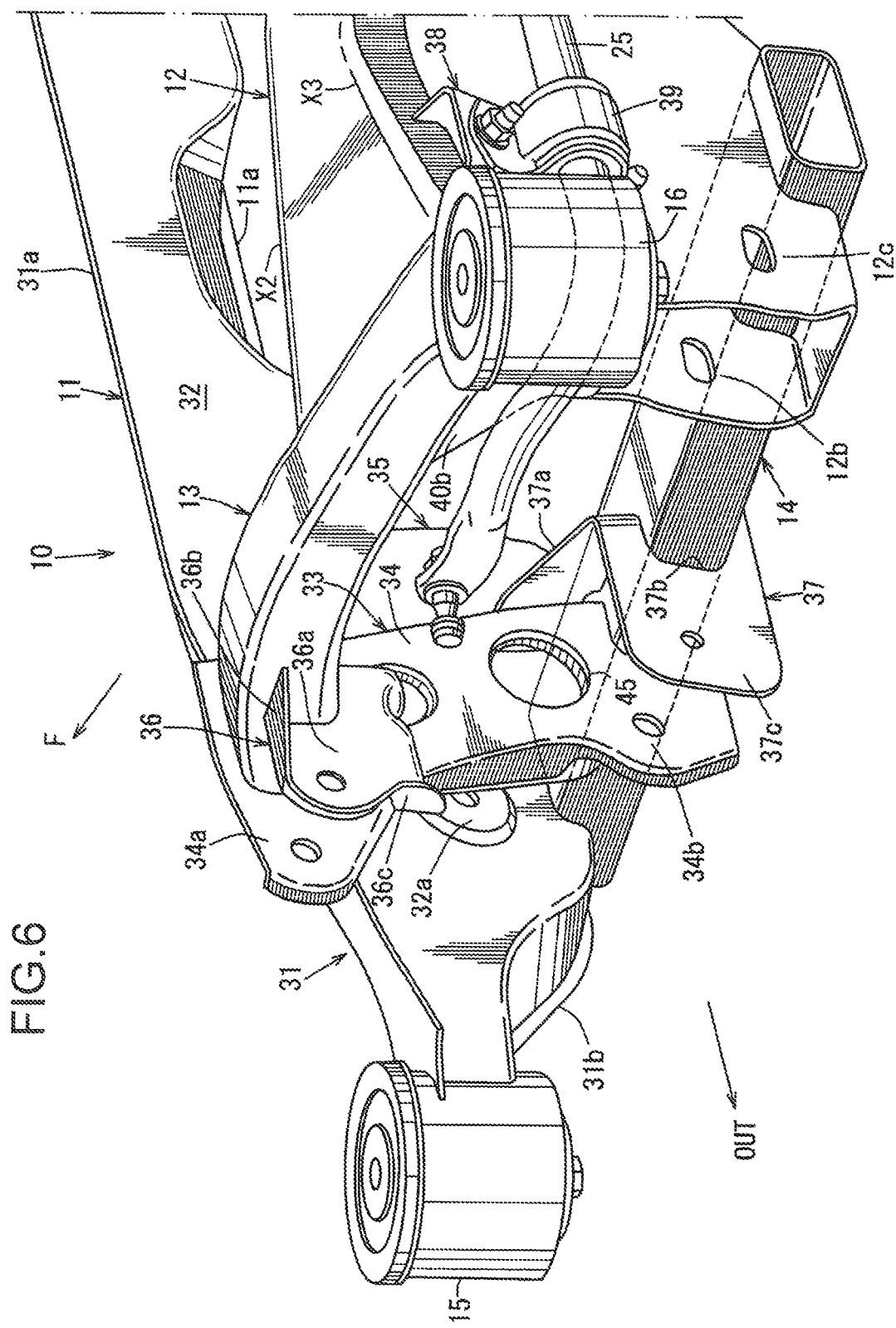
FIG. 6 is a perspective view of the rear subframe structure when viewed from rear on a vehicle left side.
Figure 7:
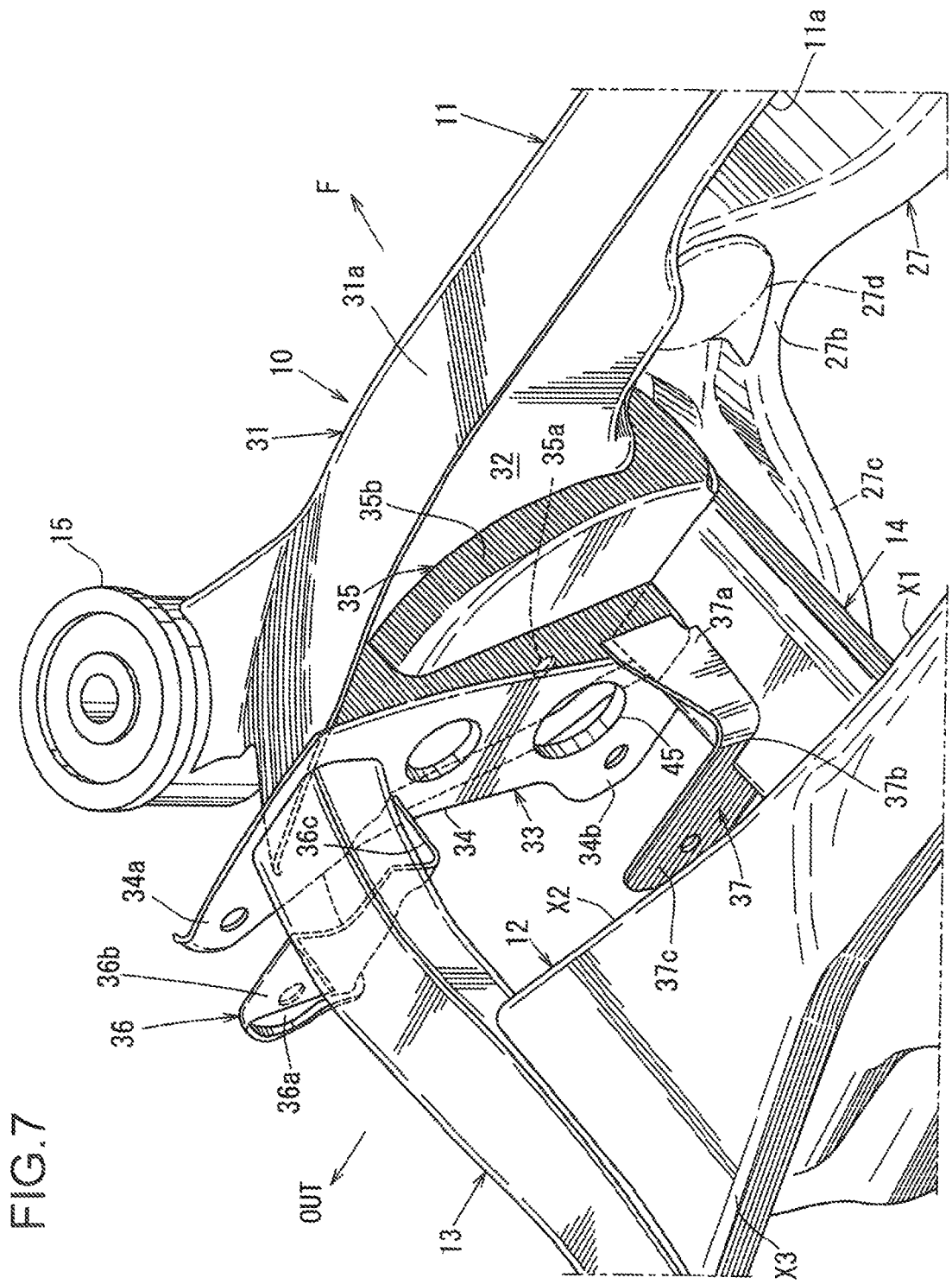
FIG. 7 is a perspective view of the rear subframe structure when viewed from rear and above on a vehicle right side.
Figure 8A:
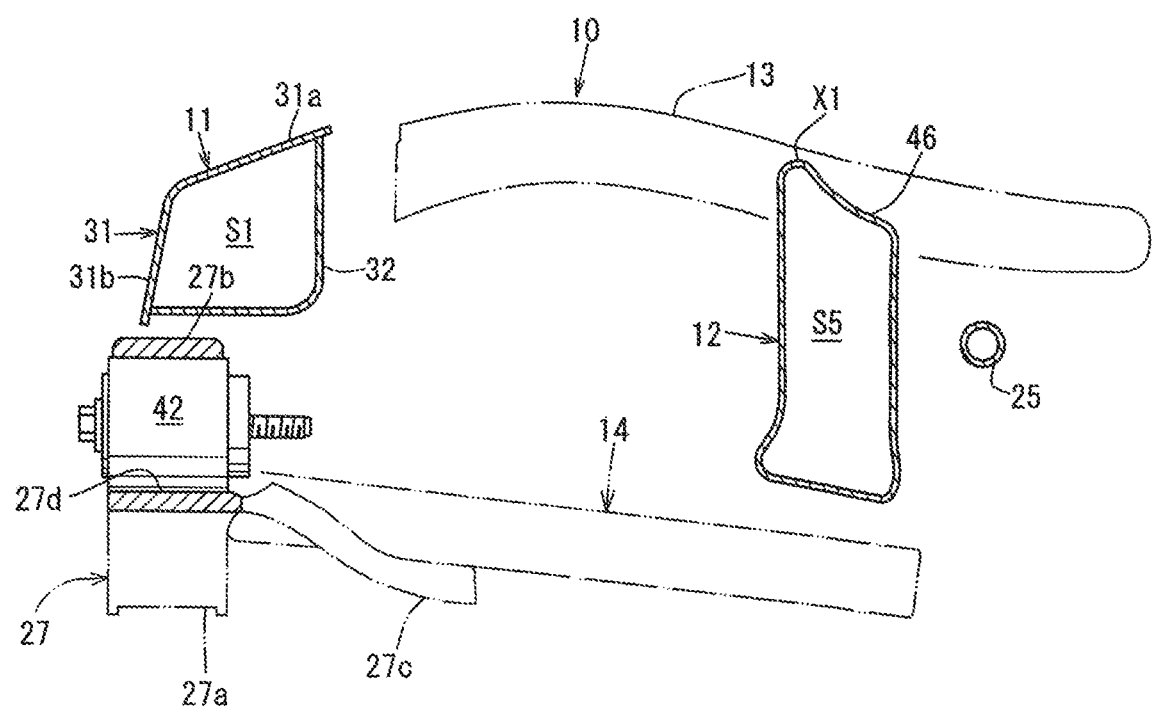
FIG. 8A is a sectional view taken along the line A-A in FIG. 2.
Figure 8B:
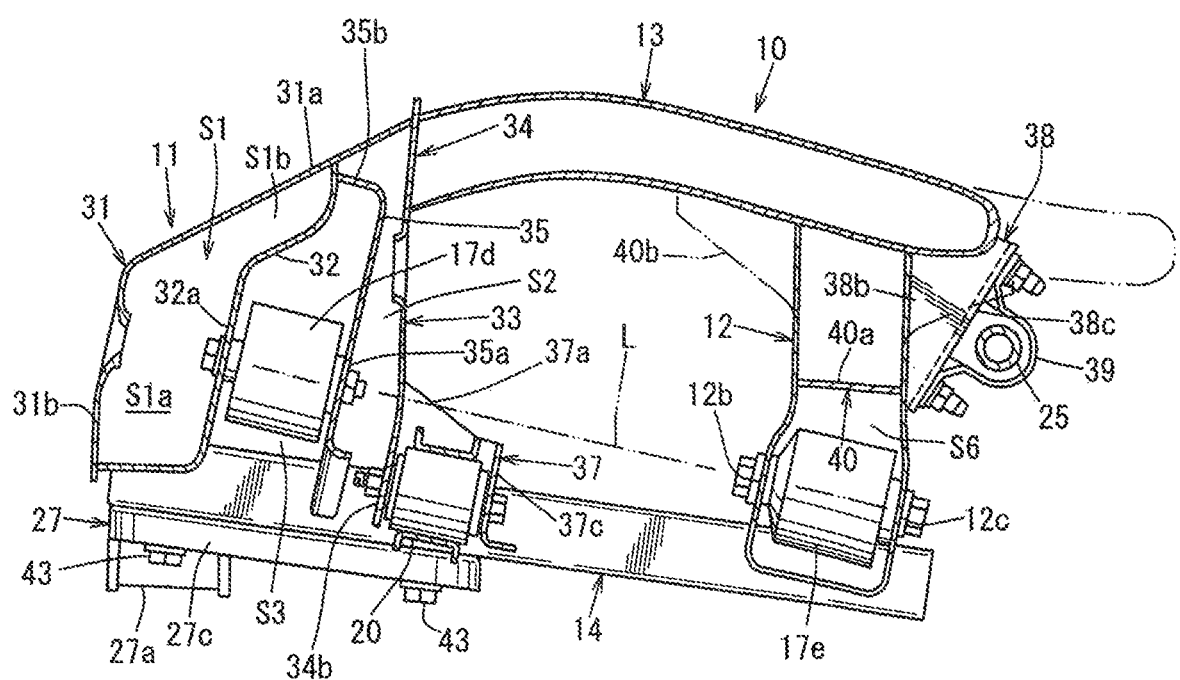
FIG. 8B is a sectional view taken alone the line B-B in FIG. 2.
Figure 9:
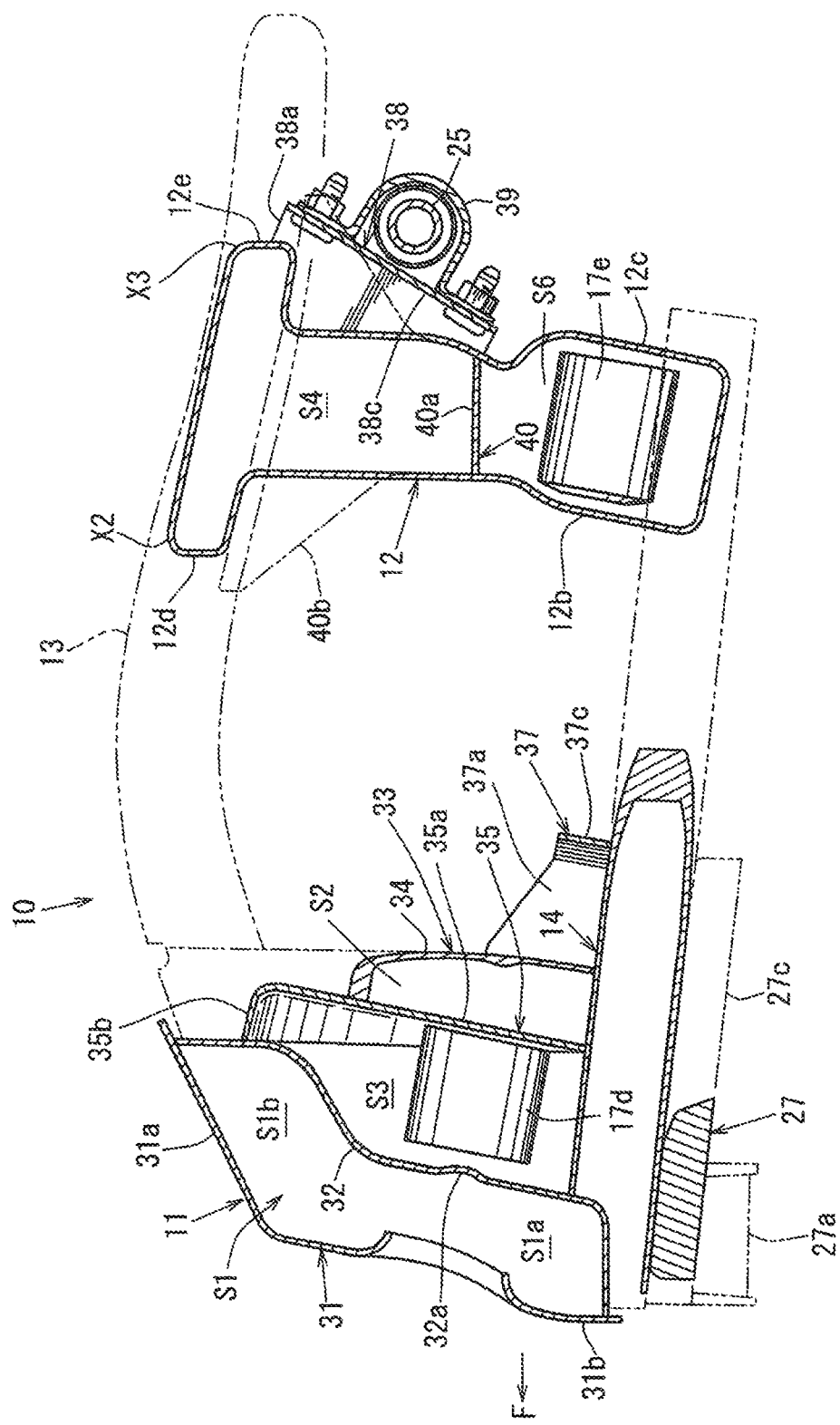
FIG. 9 is a sectional view taken along the line C-C in FIG. 2.
Figure 10:
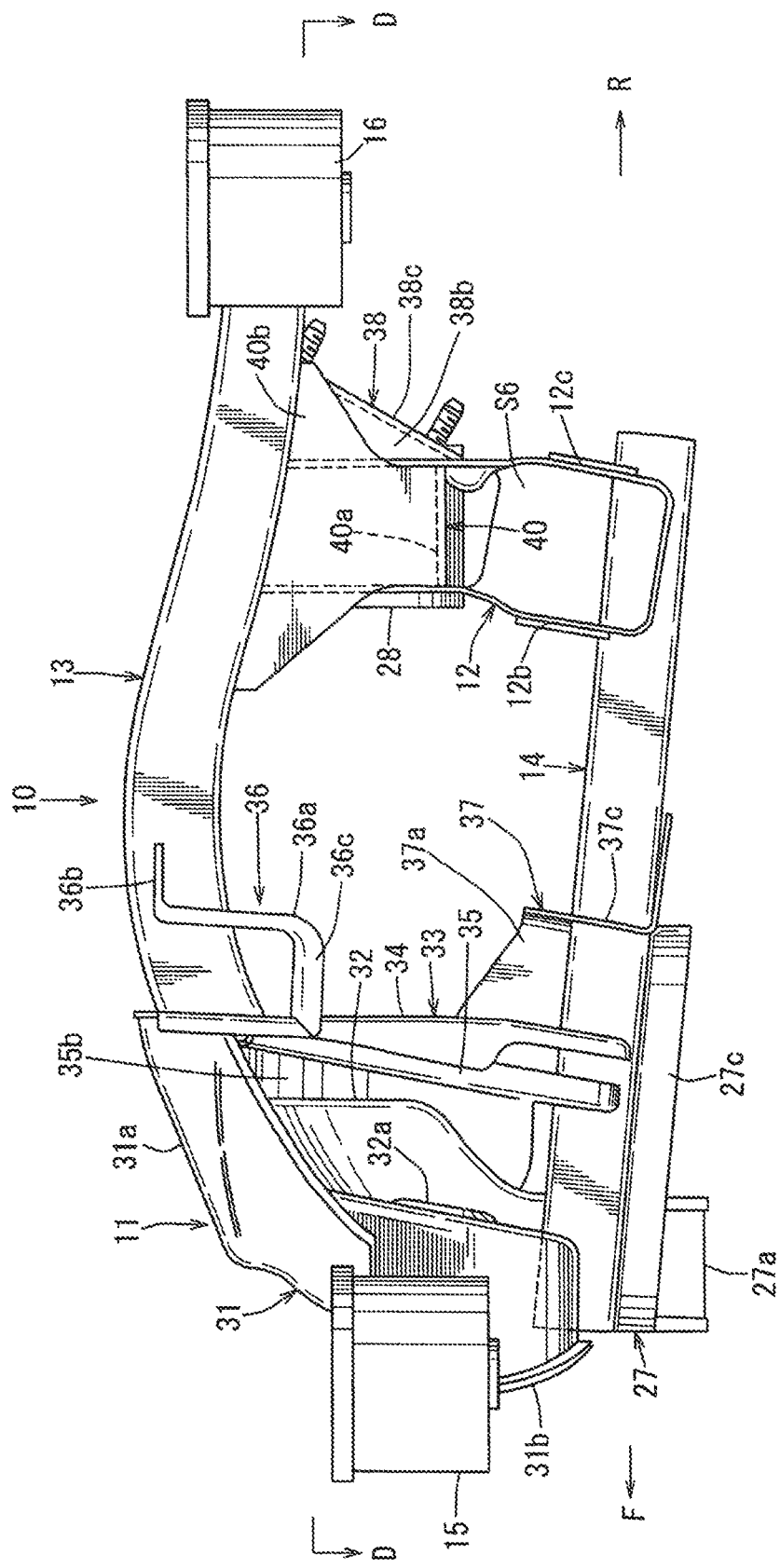
FIG. 10 is a side view illustrating essential parts of FIG. 2.
Figure 11:
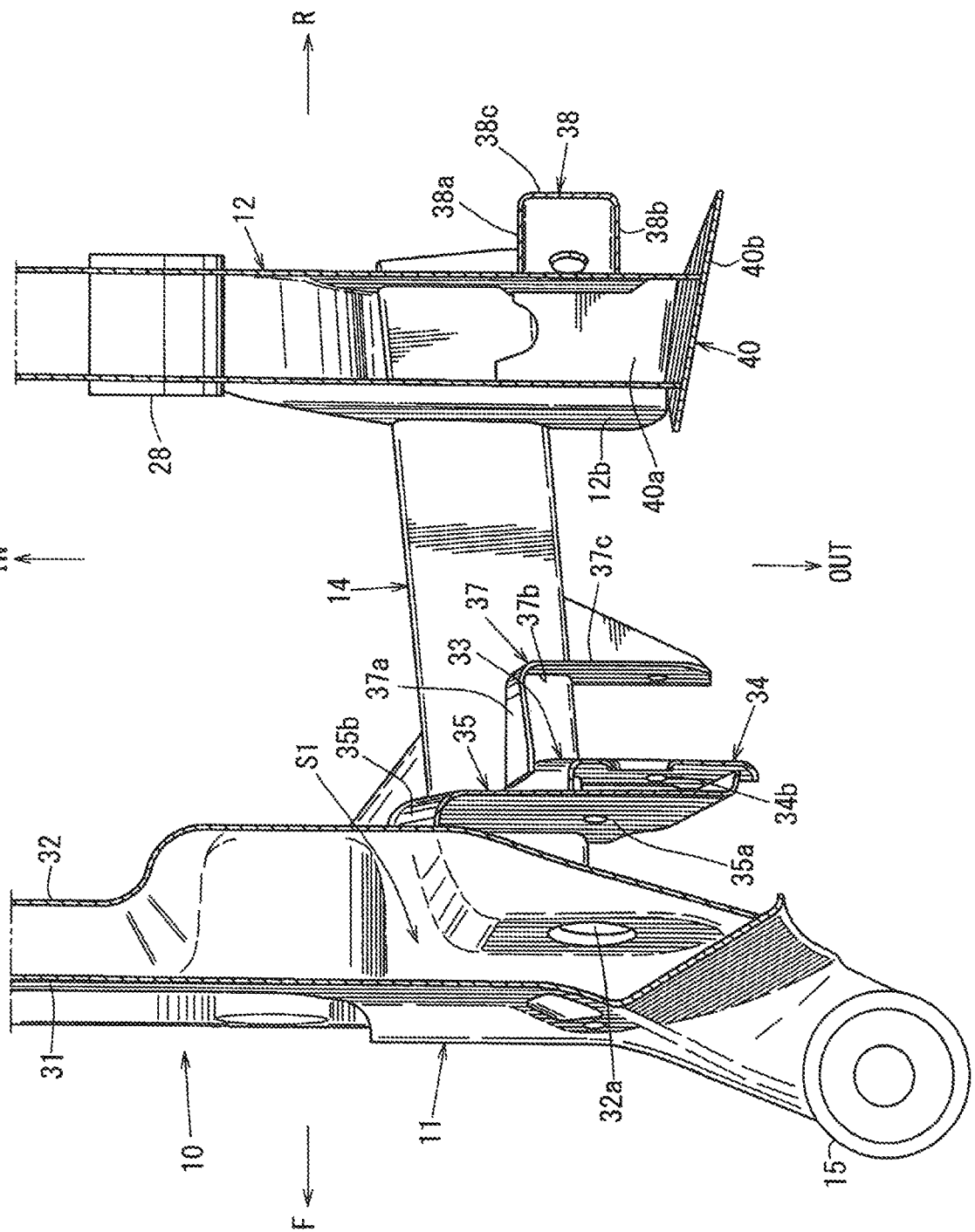
FIG. 11 is a sectional view taken along the line D-D in FIG. 10.

FIG. 6 is a perspective view of the rear subframe structure when viewed from rear on a vehicle left side, FIG. 7 is a perspective view of the rear subframe structure when viewed from rear and above on a vehicle right side, FIG. 8A is a sectional view taken along the line A-A in FIG. 2, FIG. 8B is a sectional view taken along the line B-B in FIG. 2, FIG. 9 is a sectional view taken along the line C-C in FIG. 2, FIG. 10 is a side view illustrating essential parts of FIG. 2, and FIG. 11 is a sectional view taken along the line D-D in FIG. 10.

FIG. 6 to FIG. 11 illustrate a configuration of a vehicle left side portion. The configuration of a vehicle right side portion is symmetrical or substantially symmetrical with respect to the configuration of the vehicle left side portion in a left-right direction.

As illustrated in FIG. 8A, FIG. 8B, FIG. 9, and FIG. 11, the front cross member 11 has a structure such that a front panel 31 and a rear panel 32 are joined and fixed, and has a closed section S1 extending in the vehicle width direction. Specifically, the closed section S1 is constituted by the rear panel 32 on the middle side (in other words, on the vehicle rear side) of the rear subframe 10, and the front panel 31 including an upper surface 31a extending rearwardly than the rear panel 32 and including a front surface 31b extending downwardly than the rear panel 32.

As illustrated in FIG. 1 and FIG. 6, left and right lateral portions of the front cross member 11 are inclined forwardly and downwardly. Thereby, as illustrated in FIG. 8B and FIG. 9, a front portion of the closed section S1 extends downwardly to form an enlarged closed section S1a. Further, as illustrated in FIG. 8B and FIG. 9, a rear portion of the closed section S1 on a lateral portion of the front cross member 11 in the vehicle width direction is projected upwardly and rearwardly to form a recessed closed section S1b. The enlarged closed section S1a and the recessed closed section S1b are continued.

As illustrated in FIG. 6, FIG. 8B, and FIG. 9, there is formed, on a rear portion of the enlarged closed section S1a, a lower-arm support portion 32a for supporting a front mounting portion 17d out of front and rear mounting portions 17d and 17e of the lower arm 17.

As illustrated in FIG. 8B, the upper side member 13 is connected to a rear surface of an upper portion of the closed section S1, specifically, to a rear surface of the recessed closed section S1b via the pillar portion 33.

As described above, by inclining a lateral portion of the front cross member 11 in the vehicle width direction forwardly and downwardly, it is possible to enlarge a front portion of the closed section S1 downwardly (see the enlarged closed section S1a) to secure rigidity in the vehicle width direction, while avoiding interference with a rear seat pan (a rear floor panel), whereby rigidity in the vehicle width direction is secured without narrowing a swing range of the lower arm 17.

In other words, even in a structure configured such that the rear subframe 10 is disposed in a narrow space of a lower portion of a rear seat pan where it is not possible to connect the front cross member 11 and the upper side member 13, while securing a sufficient closed sectional structure (a linearly extending closed sectional structure), it is possible to secure high rigidity in the vehicle width direction, and to secure a space for the lower-arm support portion 32a (specifically, secure a space for the mounting portion 17d of the lower arm 17).

As illustrated in FIG. 6, FIG. 7, and FIG. 8B, the pillar portion 33 has a shape of a closed section S2 constituted by a rear plate 34 including an upper-arm support portion 34a for supporting a mounting portion 21b (see FIG. 2) of the upper arm 21, and a front plate 35 including a lower-arm support portion 35a. As illustrated in FIG. 6 and FIG. 11, the rear plate 34 is formed to have a U-shaped section in a plan view.

As illustrated in FIG. 7, the front plate 35 includes a dome-shaped flange portion 35b which extends from an outer peripheral edge of a main surface portion thereof forwardly of the vehicle, and which is abutted against a back surface of the rear panel 32 of the front cross member 11 and welded.

As illustrated in FIG. 8B and FIG. 9, a second closed section S3 extending in the vehicle width direction is constituted by the closed section S1 of a lateral portion of the front cross member 11 in the vehicle width direction, the front plate 35 located immediately on the rear side of the closed section S1, and an upper surface of the lower side member 14. Thereby, a space for supporting a lower arm is secured, and connection rigidity of the lower side member 14 is enhanced.

As illustrated in FIG. 7, a lower portion of the front plate 35 is fixed by abutment against an upper surface of the lower side member 14 and against an outer lateral surface of the lower side member 14 in the vehicle width direction and by welding.

As illustrated in FIG. 8B, the pillar portion 33 having a structure of the closed section S2 is formed immediately on the rear side of the second closed section S3. The pillar portion 33 includes the front plate 35, extends upwardly from the lower side member 14, and is connected to a back surface of the front cross member 11. A rear surface of an upper portion of the pillar portion 33, specifically, a rear surface of an upper portion of the rear plate 34 is connected to a front portion of the upper side member 13 by welding.

In other words, the front-side lower-arm support portion 32a out of the lower-arm support portions 32a and 35a is formed by a part (a part of the enlarged closed section S1a) configured such that a front portion of the closed section S1 extends downwardly out of a lateral portion of the front cross member 11 in the vehicle width direction, and the rear-side lower-arm support portion 35a is formed by the pillar portion 33 having a structure of the closed section S2. Further, the pillar portion 33 is connected to all of the upper side member 13, the lower side member 14, and the front cross member 11. According to this configuration, it is possible to distribute load to be input via the lower-arm support portions 32a and 35a, and to attain high rigidity of the rear subframe 10.

Further, in order to secure a sufficient space for supporting a lower arm while lowering a lateral portion of the front cross member 11 in the vehicle width direction, the pillar portion 33 (specifically, the rear plate 34) is used as a set plate, while reducing the size of the recessed closed section S1b in the up-down direction than the size of the upper side member 13 in the up-down direction, whereby connection rigidity is enhanced.

As illustrated in FIG. 6, FIG. 7, and FIG. 8B, the vertical-wall-shaped pillar portion 33 constituted by the front plate 35 and the rear plate 34, and extending in the vehicle width direction and in the up-down direction is held and fixed between a lateral portion of the front cross member 11 in the vehicle width direction, and a front end of the upper side member 13.

As illustrated in FIG. 6, FIG. 7, and FIG. 8B, a lower portion of the pillar portion 33, specifically, lower portions of the front plate 35 and the rear plate 34 are respectively connected to an upper surface of the lower side member 14 and to an outer lateral surface of the lower side member 14 in the vehicle width direction. The upper-arm support portion 34a is formed on an upper portion of the rear plate 34, and the lower-arm support portion 35a is formed on a lower portion of the front plate 35.

According to the aforementioned configuration, load input from the upper and lower arms (the lower arm 17 and the upper arm 21) is directly transmitted to the upper and lower side members 13 and 14 and to the front cross member 11 for load distribution, whereby high rigidity of the rear subframe 10 is attained. Further, the upper-arm support portion 34a and the lower-arm support portion 35a are formed on the pillar portion 33. This makes it possible to increase positioning accuracy of the lower arm 17 and the upper arm 21.

As illustrated in FIG. 6, FIG. 7, and FIG. 10, the upper-arm support portion 34a includes a substantially Z-shaped upper-arm support bracket 36 on a rear portion thereof in a side view.

The upper-arm support bracket 36 includes a vertical piece 36a extending in the up-down direction, an upper piece 36b extending rearwardly from an upper end of the vertical piece 36a, and a lower piece 36c extending forwardly from a lower end of the vertical piece 36a. The upper-arm support bracket 36 is integrally formed by these pieces 36a to 36c. An upper half of the vertical piece 36a and the upper piece 36b are abutted against an outer lateral surface of the upper side member 13 in the vehicle width direction and welded, and a front end of the lower piece 36c is abutted against a back surface of the rear plate 34 and welded.

As illustrated in FIG. 10, the upper-arm support bracket 36 holds the pillar portion 33 in cooperation with the front cross member 11. Further, a front portion of the upper side member 13 and the pillar portion 33 are connected by the upper-arm support bracket 36. By the aforementioned holding structure of the pillar portion 33 by the upper-arm support bracket 36 and the front cross member 11, the pillar portion 33 is securely supported, and the upper arm 21 is supported by the upper-arm support portion 34a on the upper portion of the pillar portion 33 and the upper-arm support bracket 36, whereby support rigidity of the upper arm 21 is enhanced. Further, connection rigidity between the pillar portion 33 and the upper side member 13 is enhanced.

As illustrated in FIG. 8B, an upper portion of the rear plate 34 of the pillar portion 33 is directly connected to the front cross member 11 (specifically, a rear portion of the upper surface 31a of the front panel 31), and the lower-arm support portions 35a and 32a are constituted by a lower portion of the front plate 35 and a lower portion of the front cross member 11 (specifically, a lower portion of the rear panel 32). Thus, load from the upper arm 21 and the lower arm 17 is transmitted to the front cross member 11 and to the upper and lower side members 13 and 14 for load distribution, and high rigidity of the rear subframe 10 is attained.

As illustrated in FIG. 8B and FIG. 10, the pillar portion 33 extends between the upper side member 13 and the lower side member 14, and the lower-arm support portion 35a is formed on a front surface of the pillar portion 33 on an upper side of the lower side member 14, in other words, on the front plate 35.

Further, as illustrated in FIG. 6, FIG. 7, and FIG. 8B, a toe control link support portion 34b is formed on a rear surface of the pillar portion 33 located below the lower-arm support portion 35a, and on an outer lateral side of the lower side member 14 in the vehicle width direction, in other words, on the rear plate 34.

As illustrated in FIG. 6, FIG. 7, and FIG. 11, a toe control link support bracket 37 (hereinafter, simply referred to as a link support bracket) for supporting the toe control link support portion 34b from the rear side is provided on the rear subframe 10.

As illustrated in FIG. 6, FIG. 7, and FIG. 11, the link support bracket 37 includes a front piece 37a fixed upright on an upper surface of the lower side member 14 and extending in the vehicle front-rear direction, and a lateral piece 37c extending from a rear end of the front piece 37a outwardly in the vehicle width direction. The link support bracket 37 is integrally formed by these pieces 37a and 37b. A horizontally U-shaped cutaway portion 37b is formed in the lateral piece 37c. The cutaway portion 37b of the lateral piece 37c is welded and fixed to an upper surface, an outer lateral surface, and a lower surface of the lower side member 14.

Further, the link support bracket 37 is mounted between the lower side member 14 and a back surface of the lower-arm support portion 35a of the pillar portion 33.

The lower-arm support portion 35a and the toe control link support portion 34b are displaced in the up-down direction. Thereby, a compact and dense layout by the support portions 35a and 34b, the lower arm 17, and the toe control link 20 is obtained. Further, load from the lower arm 17 and the toe control link 20 is distributed to an upper surface and a lateral surface of the lower side member 14, and further to the upper and lower side members 13 and 14, whereby high rigidity of the rear subframe 10 is attained. In addition to the above, the pillar portion 33 supports two components i.e. the lower arm 17 and the toe control link 20 to increase positioning accuracy between the lower arm 17 and the toe control link 20.

The lower-arm support portion 35a for supporting the lower arm 17 is formed as a first arm support portion. Therefore, it is possible to offset the front mounting portion 17d of the lower arm 17 to the inner side in the vehicle width direction than an outer lateral edge of the lower side member 14 in the vehicle width direction. Thus, it is possible to increase freedom in setting an imaginary first arm swing centerline L illustrated in FIG. 8B.

As illustrated in FIG. 8B, the mounting portions 17d and 17e are formed on front and rear portions of the lower arm 17 to be supported by the lower-arm support portion 35a. Specifically, the lower arm 17 includes the front mounting portion 17d on the front side with respect to the pivot center of the lower arm 17, and the rear mounting portion 17e on the rear side with respect to the pivot center of the lower arm 17.

Further, the lower-arm rear-side support portions 12b and 12c (corresponding to a lower-arm support portion of the present invention) connected to the rear cross member 12 or integrally formed with the rear cross member 12 are formed such that the first arm swing centerline L located on the lower side than the lower-arm support portion 35a of the pillar portion 33 and passing through the front and rear mounting portions 17d and 17e of the lower arm 17 is located on the upper side than the link support portion 34b.

As illustrated in FIG. 8B, the upper and lower side members 13 and 14 are connected by the rear cross member 12 in the up-down direction, and form a rigid box-shaped structure. Further, the rear-side support portions 12b and 12c of the lower arm 17 are formed on a lower portion of the rear cross member 12 to distribute load of the lower arm 17 in the front-rear direction via the front and rear mounting portions 17d and 17e. Further, the first arm swing centerline L (an imaginary axis) is formed on the upper side than the link support portion 34b with an angle at which the front and rear mounting portions 17d and 17e of the lower arm 17 obtain a recession angle. Thereby, even in a narrow space such that the rear seat pan comes close, it is possible to rigidly form the lower-arm front-side support portion 35a and the link support portion 34b.

Specifically, it is possible to avoid interference with the toe control link 20, while increasing support rigidity by a support portion of the lower arm 17, whereby it is easy to set a recession angle.

As illustrated in FIG. 9 and FIG. 10, the rear cross member 12 for connecting the upper side member 13 and the lower side member 14 in the up-down direction has a structure of a closed section S4 of a T-shape in a side view, whose size is increased in the vehicle front-rear direction along an inner lateral surface of the upper side member 13 in the vehicle width direction (in other words, an inner hollow structure of a T-shape in a side view).

As illustrated in FIG. 1 and FIG. 2, the closed section S4 of a T-shape in a side view is formed only on left and right side portions of the rear cross member 12. As illustrated in FIG. 8A, a closed section S5 extending in the up-down direction and having an I-shape in a side view is formed on an intermediate portion of the rear cross member 12 in the vehicle width direction. The closed sections S4 and S5 communicate with each other.

Further, as illustrated in FIG. 9, the lower-arm rear-side support portions 12b and 12c are formed on the lower side of a lateral portion of the rear cross member 12 in the vehicle width direction, which is associated with the closed section S4 of a T-shape in a side view; and the rear mounting portion 17e of the lower arm 17 is supported by the lower-arm rear-side support portions 12b and 12c.

The rear cross member 12 including the closed section S4 of a T-shape in a side view includes, on an upper portion thereof, an upper-surface front-side projection portion 12d and an upper-surface rear-side projection portion 12e bulging in the vehicle front-rear direction. A stabilizer support bracket 38 (corresponding to a stabilizer support member of the present invention) is mounted between the upper-surface rear-side projection portion 12e, and the rear-side lower-arm rear-side support portion 12c (in this embodiment, near the rear-side lower-arm rear-side support portion 12c) out of the paired front-side and rear-side lower-arm rear-side support portions 12b and 12c.

As described above, forming the rear cross member 12 into a structure of the closed section S4 of a T-shape in a side view makes it possible to increase the size of a closed section of the rear cross member 12 and to increase rigidity. Further, mounting the stabilizer support bracket 38 between the upper-surface rear-side projection portion 12e and the lower-arm support portion 12c of the rear cross member 12 makes it possible to reinforce the rear cross member 12 by the bracket 38, and to secure a space for installing the stabilizer 25 without increasing the number of parts.

Figure 13A:
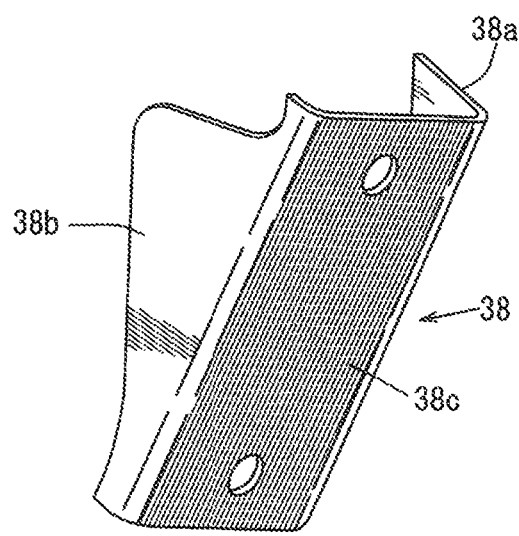
FIG. 13A is a perspective view of a stabilizer support member.

FIG. 13A is a perspective view illustrating the stabilizer support bracket 38. As illustrated in FIG. 13A, the stabilizer support bracket 38 is integrally formed by a pair of inner and outer lateral pieces 38a and 38b in the vehicle width direction, and a rear piece 38c for connecting the lateral pieces 38a and 38b. The rear piece 38c is inclined in a state that a front portion thereof is inclined downwardly and a rear portion thereof is inclined upwardly when assembling the stabilizer support bracket 38 to the rear subframe 10 (specifically, the rear cross member 12) is completed.

The stabilizer 25 is mounted to the rear piece 38c of the stabilizer support bracket 38 with use of a support bracket 39, which is fastened by a bolt and a nut (see FIG. 6 and FIG. 9).

As illustrated in FIG. 1 and FIG. 2, there are formed, on a top portion of the rear cross member 12, a ridge X1 extending in the vehicle width direction on an intermediate portion thereof in the vehicle width direction, ridges X2 and X2 extending in the vehicle width direction from left and right ends of the ridge X1 along an upper end of a front portion of the upper-surface front-side projection portion 12d, and ridges X3 and X3 extending in the vehicle width direction from connection portions of the ridges X1 and X2 along an upper end of a rear portion of the upper-surface rear-side projection portion 12e. The ridges X1, X2, and X3 are combined substantially in an X-shape in a plan view. Thereby, torsional rigidity of the rear cross member 12 is increased.

As illustrated in FIG. 9 and FIG. 10, a partition member 40 (corresponding to a partition wall of the present invention) is provided within the closed section S4 in the vicinity of a lower end of the stabilizer support bracket 38 of the rear cross member 12. A lower-portion closed section S6 extending in the vehicle width direction is formed by the partition member 40 and an upper surface of the lower side member 14.

Forming the lower-portion closed section S6 makes it possible to increase local rigidity of the rear cross member 12 in the vehicle width direction, to increase load transmission from the lower-arm rear-side support portions 12b and 12c, to prevent sectional deformation by concentration of stress, and to increase rigidity in the vehicle width direction.

Figure 12A:
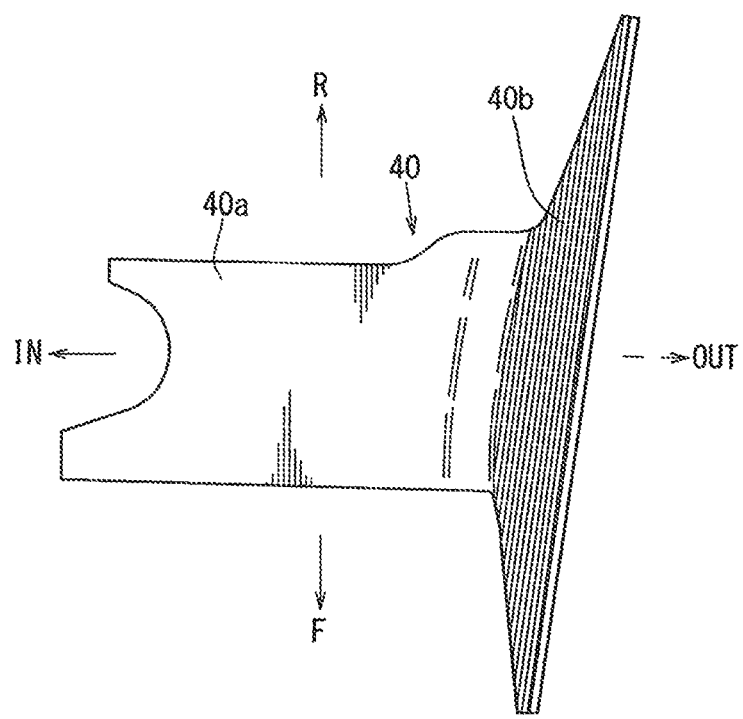
FIG. 12A is a plan view of a partition member.
Figure 12B:
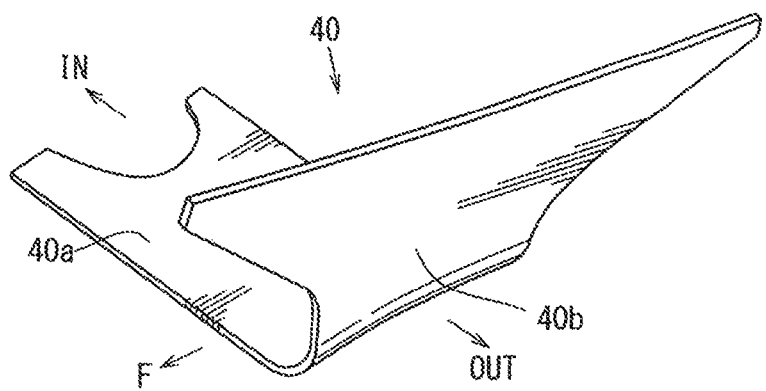
FIG. 12B is a perspective view of the partition member.

FIG. 12A is a plan view of the partition member 40, and FIG. 12B is a perspective view of the partition member 40. The partition member 40 includes a lower piece 40a located within the closed section S4 of the rear cross member 12 and extending in the vehicle width direction, and a lateral piece 40b extending from an outer end of the lower piece 40a in the vehicle width direction upwardly by a predetermined amount corresponding to a width of the rear cross member 12 in the front-rear direction, and then, whose sizes of front and rear portions are increased. The partition member 40 is integrally formed by these pieces 40a and 40b. As illustrated in FIG. 11, the lower piece 40a is welded and fixed to front and rear walls of the rear cross member 12. As illustrated in FIG. 9, an upper end of the lateral piece 40b is welded and fixed to a lower surface of the upper-surface front-side projection portion 12d and to a lower surface of the upper-surface rear-side projection portion 12e.

The rear cross member 12 may be formed by combining two members, or may be formed by a hydroformed component.

Figure 13B:
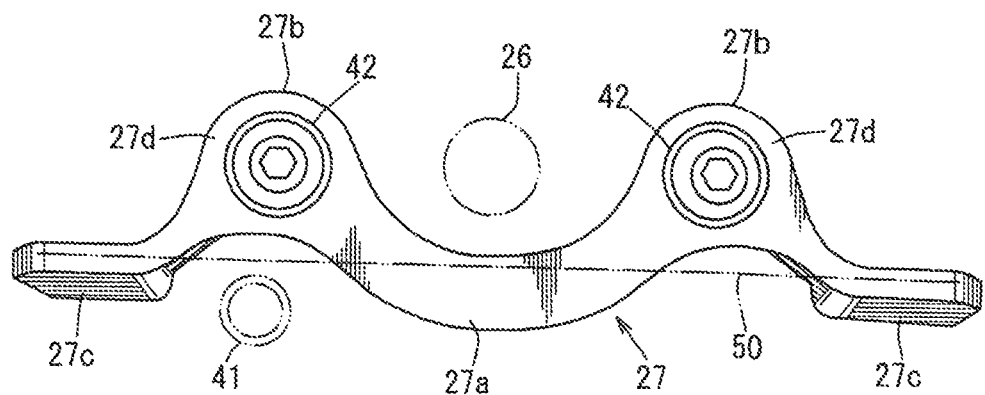
FIG. 13B is a front view of a brace.

FIG. 13B is a front view enlargedly illustrating the brace 27. As illustrated in FIG. 4 and FIG. 13B, the brace 27 includes a middle downwardly bulging portion 27a bulging downwardly while avoiding the propeller shaft 26, and a pair of left and right upwardly bulging portions 27b and 27b bulging upwardly on left and right outer sides of the middle downwardly bulging portion 27a in the vehicle width direction while avoiding an exhaust pipe 41 (the exhaust pipe 41 is provided only on the vehicle right side). The brace 27 is integrally formed by these portions. In this embodiment, the brace 27 is constituted by an aluminum die cast member.

As illustrated in FIG. 13B, ends of the middle downwardly bulging portion 27a, and the upwardly bulging portions 27b and 27b on the left and right sides of the middle downwardly bulging portion 27a overlap each other in a plan view (or in a bottom view), and the bulging portions 27a and 27b are smoothly and integrally connected.

As illustrated in FIG. 3, tunnel-portion mounting portions 27c and 27c (hereinafter, simply referred to as mounting portions) extending rearwardly up to the positions of the vehicle-body mounting portions of the toe control link 20 are integrally formed on lateral portions of the brace 27 in the vehicle width direction.

Further, as illustrated in FIG. 13B, a load transmission path 50 for linearly connecting the left and right tunnel-portion mounting portions 27c and 27c in the vehicle width direction is formed in the brace 27.

According to the aforementioned configuration, even in a portion where it is difficult to dispose a thick brace in a straight manner in the vehicle width direction, it is possible to secure the load transmission path 50 for linearly connecting the left and right mounting portions 27c and 27c of the brace 27 in the vehicle width direction, while avoiding the propeller shaft 26 and the exhaust pipe 41, and to reinforce the brace 27 itself by the bulging portions 27a and 27b to thereby reinforce the front cross member 11.

As illustrated in FIG. 4 and FIG. 13B, a differential mount portion 27d for supporting a differential mount bush 42 is provided for each of the paired left and right upwardly bulging portions 27b of the brace 27. This enables to reinforce the differential mount portion 27d by the upwardly bulging portion 27b, and to support a rear differential device (not illustrated) without increasing the number of parts. Thus, it is not necessary to additionally provide a differential mount bracket on the front side of the rear differential device.

As illustrated in FIG. 2, a rear differential device (not illustrated) is supported by the differential mount bush 42, and by the differential mount bracket 29 located on the rear side of the differential mount bush 42.

As illustrated in FIG. 3 and FIG. 8B, the brace 27 is connected to the lower side member 14 at a position where the brace 27 overlaps, in a bottom view, the lower-arm support portions 32a and 35a constituted by a lower portion of the front cross member 11, and the pillar portion 33 formed on the rear side of the lower portion of the front cross member 11.

Specifically, the mounting portion 27c of the brace 27 is connected and fixed to a bottom surface of the lower side member 14 so as to overlap the lower-arm support portions 32a and 35a in a bottom view with use of a plurality of fastening members 43 and 43 such as bolts at a position away from the tunnel-portion mounting portion 27c in the front-rear direction. Thus, the lower-arm support portions 32a and 35a are reinforced with use of the brace 27.

In FIG. 1 and FIG. 5, the reference numeral 44 denotes an opening portion for weight reduction. In FIG. 6 and FIG. 7, the reference numeral 45 denotes an opening portion for use in mounting the mounting portion 17d of the lower arm 17. In FIG. 8A, the reference numeral 46 denotes an arc-shaped recess portion for avoiding interference with a spare tire pan.

As described above, the rear subframe structure of the embodiment is a rear subframe structure provided with the rear subframe 10 configured such that the front cross member 11 extending in the vehicle width direction, the rear cross member 12 extending in the vehicle width direction on the rear side of the front cross member 11, the paired left and right upper side members 13 extending in the vehicle front-rear direction, and the paired left and right lower side members 14 extending in the vehicle front-rear direction are connected in a substantially grid pattern in a plan view of a vehicle; the vehicle-body mounting portions 15 and 16 formed on both ends of the front cross member 11 in the vehicle width direction, and on rear ends of the upper side members 13, respectively. The rear cross member 12 connects the upper side members 13 and the lower side members 14 in an up-down direction. The rear cross member 12 is formed into a shape having the closed section S4 of a T-shape in a side view configured such that a size thereof in a vehicle front-rear direction is increased along the upper side members 13. A lower-arm support portion (see the lower-arm rear-side support portions 12b and 12c) is formed on a lower lateral portion of the rear cross member 12. A stabilizer support member (see the stabilizer support bracket 38) is mounted between the lower-arm support portion (lower-arm rear-side support portions 12b and 12c) and the upper-surface rear-side projection portion 12e of the rear cross member 12 (see FIG. 1 and FIG. 9).

According to the aforementioned configuration, the rear cross member 12 has a structure of the closed section S4 of a T-shape in a side view. Therefore, it is possible to increase a closed section of the rear cross member 12 and to increase rigidity. Further, a stabilizer support member (stabilizer support bracket 38) is mounted between the upper-surface rear-side projection portion 12e of the rear cross member 12 and the lower-arm support portion (particularly, see the support portion 12c out of the lower-arm rear-side support portions 12b and 12c). This makes it possible to reinforce the rear cross member 12. Further, it is possible to secure a space for installing the stabilizer 25 without increasing the number of parts.

In the embodiment of the present invention, the front cross member 11 is formed at a position forwardly away from the rear cross member 12. The front cross member 11 forms the closed section S1 in cooperation with the rear panel 32 on the middle side of the rear subframe 10 in a side view, and the front panel 31 including the upper surface 31a extending rearwardly than the rear panel 32 (see FIG. 8A, FIG. 8B, and FIG. 9).

According to the aforementioned configuration, an upper surface of the front cross member 11 and an upper surface of the rear cross member 12 extend in the front-rear direction. This makes it possible to increase rigidity. Further, the upper surface 31a of the front panel 31 of the front cross member 11 extends rearwardly than the rear panel 32. This makes it possible to increase the ratio of an outer shell, and to enhance torsional rigidity.

In the embodiment of the present invention, a partition wall (see the partition member 40) is formed within the closed section S4 in the vicinity of a lower end of the stabilizer support member (stabilizer support bracket 38) of the rear cross member 12. The partition wall (partition member 40) and an upper surface of the lower side member 14 form the lower-portion closed section S6 extending in the vehicle width direction (see FIG. 9).

According to the aforementioned configuration, the lower-portion closed section S6 extending in the vehicle width direction is formed between the partition wall (partition member 40) and the lower side member 14. This makes it possible to increase local rigidity in the vehicle width direction, and to increase rigidity with respect to load transmission from the lower-arm support portion (lower-arm rear-side support portions 12b and 12c). Thus, it is possible to prevent sectional deformation by stress concentration, while increasing rigidity in the vehicle width direction.

The present invention is not limited only to a configuration of the embodiment.

For example, in the embodiment, an H-shaped lower arm is exemplified as the lower arm 17 to be supported by the lower-arm support portion. Alternatively, an A-shaped lower arm may be employed, in place of the H-shaped lower arm.

The following is a summary of the present invention as described above.

An aspect of the present invention is directed to a rear subframe structure provided with a rear subframe configured such that a front cross member extending in a vehicle width direction, a rear cross member extending in the vehicle width direction on a rear side of the front cross member, a pair of left and right upper side members extending in a vehicle front-rear direction, and a pair of left and right lower side members extending in the vehicle front-rear direction are connected in a substantially grid pattern in a plan view of a vehicle; a vehicle-body mounting portion formed on each of both ends of the front cross member in the vehicle width direction, and on each of rear ends of the upper side members; a lower-arm support portion formed on a lower lateral portion of the rear cross member; and a stabilizer support member for supporting a stabilizer. The rear cross member connects the upper side members and the lower side members in an up-down direction. The rear cross member includes an upper-surface rear-side projection portion projecting rearwardly by having a closed sectional structure of a T-shape in a side view, the closed sectional structure being such that a size thereof in a vehicle front-rear direction is increased along the upper side members. The stabilizer support member is mounted between the lower-arm support portion and the upper-surface rear-side projection portion of the rear cross member.

According to the aforementioned configuration, the rear cross member has a closed sectional structure of a T-shape in a side view. Therefore, it is possible to increase a closed section of the rear cross member, and to increase rigidity by increasing a connection length with respect to the upper side member. Further, the stabilizer support member is mounted between the upper-surface rear-side projection portion of the rear cross member and the lower-arm support portion. This makes it possible to reinforce the rear cross member. Further, it is possible to secure a space for installing a stabilizer, while suppressing projection of the stabilizer from the rear subframe, without increasing the number of parts.

In the embodiment of the present invention, the front cross member is formed at a position forwardly away from the rear cross member. The front cross member forms a closed section in cooperation with a rear panel on a middle side of the rear subframe in a side view, and a front panel including an upper surface thereof extending rearwardly than the rear panel.

According to the aforementioned configuration, an upper surface of the front cross member and an upper surface of the rear cross member extend in the front-rear direction. This makes it possible to increase rigidity. Further, an upper surface of the front panel of the front cross member extends rearwardly than the rear panel. This makes it possible to increase the ratio of an outer shell in the aspect of material distribution, and to increase moment of inertia of area in the entirety of the rear subframe, although moment of inertia of area may be small with respect to a closed sectional structure devoid of a flange, when the structure is viewed in terms of sectional area of a single body. Further, the aforementioned configuration makes it easy to produce the product.

In the embodiment of the present invention, the rear cross member includes a partition wall within the closed section structure in a vicinity of a lower end of the stabilizer support member. The partition wall and an upper surface of the lower side member form a lower-portion closed section extending in the vehicle width direction.

According to the aforementioned configuration, a closed section extending in the vehicle width direction is formed between the partition wall and the lower side member. This makes it possible to increase local rigidity in the vehicle width direction, and to increase rigidity with respect to load transmission from the lower-arm support portion. Thus, it is possible to prevent sectional deformation by stress concentration, while increasing rigidity in the vehicle width direction.

INDUSTRIAL APPLICABILITY

As described above, the present invention is advantageously applied to a rear subframe structure provided with a rear subframe configured such that a front cross member extending in a vehicle width direction, a rear cross member extending in the vehicle width direction on the rear side of the front cross member, a pair of left and right upper side members extending in a vehicle front-rear direction, and a pair of left and right lower side members extending in the vehicle front-rear direction are connected in a substantially grid pattern in a plan view of a vehicle; and a vehicle-body mounting portion formed on each of both ends of the front cross member in the vehicle width direction, and on each of rear ends of the upper side members.

The invention claimed is:

1. A rear subframe structure, comprising:
a rear subframe configured such that a front cross member extending in a vehicle width direction, a rear cross member extending in the vehicle width direction on a rear side of the front cross member, a pair of left and right upper side members extending in a vehicle front-rear direction, and a pair of left and right lower side members extending in the vehicle front-rear direction are connected in a substantially grid pattern in a plan view of a vehicle;
a vehicle-body mounting portion formed on each of both ends of the front cross member in the vehicle width direction, and on each of rear ends of the upper side members;
a lower-arm support portion formed on a lower lateral portion of the rear cross member; and
a stabilizer support member for supporting a stabilizer, wherein
the rear cross member connects the upper side members and the lower side members in an up-down direction,
the rear cross member includes an upper-surface rear-side projection portion projecting rearwardly by having a closed sectional structure of a T-shape in a side view, the closed sectional structure being such that a size thereof in a vehicle front-rear direction is increased along the upper side members, and
the stabilizer support member is mounted between the lower-arm support portion and the upper-surface rear-side projection portion of the rear cross member.

2. The rear subframe structure according to claim 1, wherein
the front cross member is formed at a position forwardly away from the rear cross member, and
the front cross member forms a closed section in cooperation with a rear panel on a middle side of the rear subframe in a side view, and a front panel including an upper surface thereof extending rearwardly than the rear panel.

3. The rear subframe structure according to claim 1, wherein
the rear cross member includes a partition wall within the closed section structure in a vicinity of a lower end of the stabilizer support member, and
the partition wall and an upper surface of the lower side member form a lower-portion closed section extending in the vehicle width direction.

* * * * *